United States Patent

Robinson et al.

[11] Patent Number: 5,549,921
[45] Date of Patent: Aug. 27, 1996

[54] METHOD FOR FORMING SMALL DIAMETER ROPES OF GELLED AQUEOUS PRODUCT

[75] Inventors: Frederick L. Robinson, Thomaston; Ernest J. Hedberg, Deblois; Michael A. Kuhni, Milbridge; Everett L. Ramsdell, Harrington, all of Me.

[73] Assignee: Jasper, Wyman & Sons, Milbridge, Me.

[21] Appl. No.: 423,815

[22] Filed: Apr. 18, 1995

[51] Int. Cl.⁶ .................................................. A23L 1/05
[52] U.S. Cl. ........................ 426/573; 426/512; 426/514; 426/516; 426/517; 426/518; 426/575; 426/576; 426/577
[58] Field of Search ............................ 426/573, 575, 426/576, 577, 512, 514, 516, 517, 518

[56] References Cited

U.S. PATENT DOCUMENTS

| | | | |
|---|---|---|---|
| 3,892,870 | 7/1975 | Wood | 436/573 |
| 3,922,360 | 11/1975 | Sneath | 426/573 |
| 4,038,424 | 7/1977 | Davies | 426/94 |
| 4,256,772 | 3/1981 | Shanbhag et al. | 426/331 |
| 4,348,418 | 9/1982 | Smith et al. | 426/104 |
| 4,401,681 | 8/1983 | Dahle | 426/94 |
| 4,436,759 | 3/1984 | Trilling et al. | 426/573 |
| 4,504,504 | 3/1985 | Gaehring et al. | 426/321 |
| 4,542,033 | 9/1985 | Agarwala | 426/321 |
| 4,814,274 | 3/1989 | Shioya et al. | 426/573 |
| 4,859,475 | 8/1989 | Michnowski | 426/72 |
| 4,988,531 | 1/1991 | Moore et al. | 426/573 |
| 5,084,296 | 1/1992 | Lugay et al. | 426/573 |
| 5,186,970 | 2/1993 | Ogiwara et al. | 426/516 |
| 5,368,871 | 11/1994 | Konstance | 426/104 |
| 5,385,747 | 1/1995 | Katz et al. | 426/573 |
| 5,401,525 | 3/1995 | Vassiliou | 426/573 |

Primary Examiner—Esther Kepplinger
Assistant Examiner—Lien Tran
Attorney, Agent, or Firm—Cesari & McKenna

[57] ABSTRACT

A method of making long ropes of a gelled water-based formed product on a substantially continuous basis by mixing together a thermal-gelling gum and an aqueous product base, filling under pressure a plurality of confining conduits maintained at a temperature below the gelation temperature of the mixture, and controlling the filling of the conduits sequentially to provide a selected static residence time of the mixture in the conduits and to sequentially push the formed product out of the conduits after that time so formed product emerges substantially continuously from the conduits collectively.

10 Claims, 1 Drawing Sheet

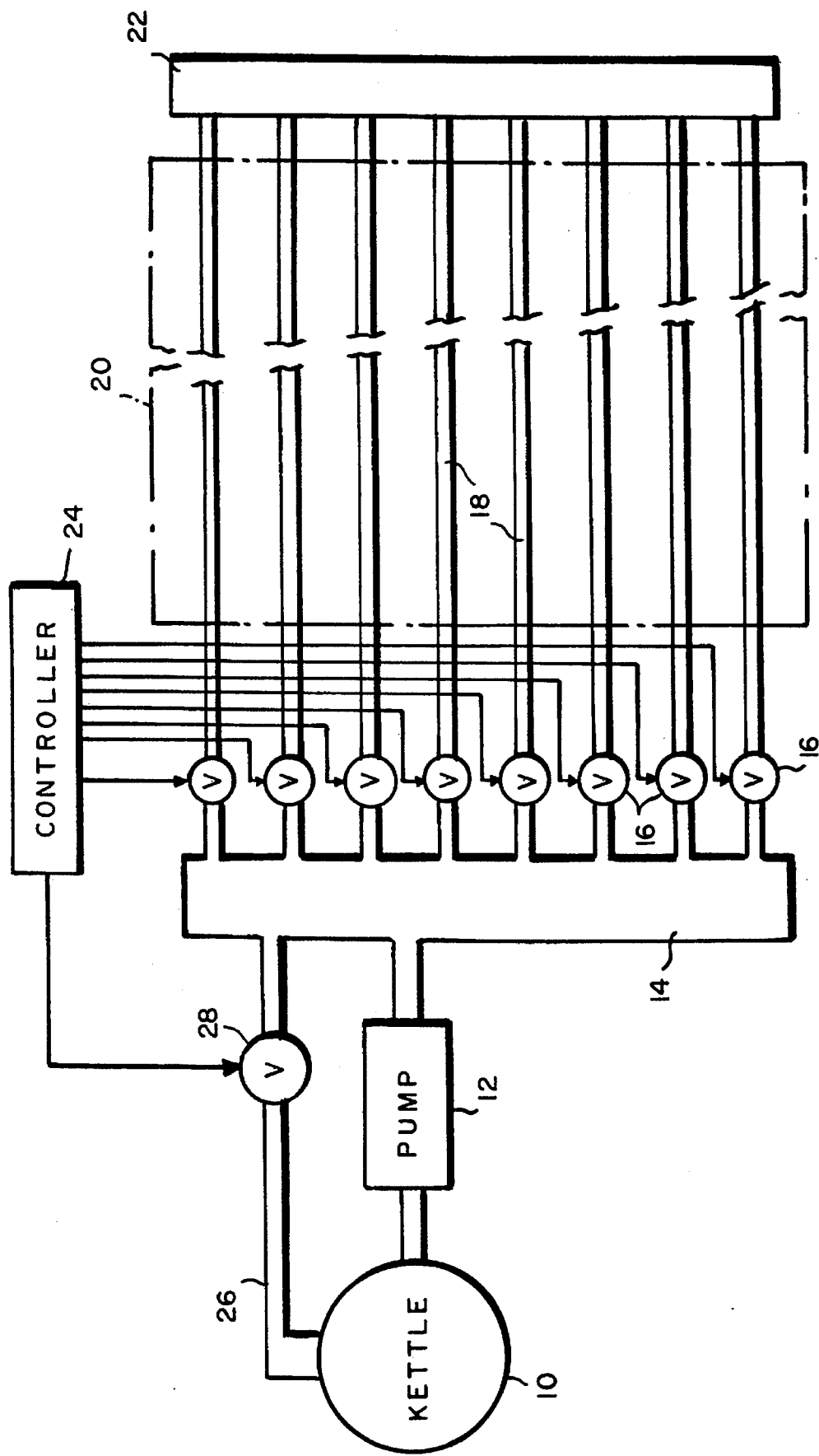

METHOD FOR FORMING SMALL DIAMETER ROPES OF GELLED AQUEOUS PRODUCT

FIELD OF THE INVENTION

This invention is concerned with a process for forming a gelled aqueous product through extrusion. It relates more particularly to such a process for forming high-moisture gels using thermal-setting gums, especially gels comprising small-diameter, high-sugar-content reformed fruit products. The invention also concerns apparatus for carrying out the process.

BACKGROUND OF THE INVENTION

Extrusion systems have been developed to form many types of products in the industrial, pharmaceutical and food industries. Most if not all of these extrusion systems have been designed to continuously form very high solids, very low moisture products by heating in the barrel of a single or double screw extruder and extruding through a die. In such cases, the formed product is held together upon extrusion by the self-adhesion of the almost-dry mass. An example of this is pasta, which is held together upon extrusion by the glutens in the flour. Another example is the simulated fruit pieces made by the method described in U.S. Pat. No. 5,084,296 (Lugay et al.). There, a mix containing gelling hydrocolloids and a minimal level of moisture is heated and then cooled in a single or double-screw extruder with different temperature zones. As a result of the low moisture content of the products produced in that fashion, the products tend to have relatively poor shape retention. Also, many food products lose their original flavor during processing and require the addition of flavors.

Another well-known process for producing shaped food and other products involves using chemical-setting gums such as alginates and/or cellulose ethers. For example, U.S. Pat. No. 4,436,759 (Trilling) discloses a process for extruding or molding a slurry of foodstuffs mixed with a chemical-setting binder. Although that patented process is an improvement on the prior methods that rely on chemical setting agents to form the food products, it does have the disadvantage of requiring very careful control of product hold times and also requires the use of specific chemical-setting gums which can interfere with the natural flavors of the products being shaped. In addition, the time required for the formation of the gel under such conditions is excessively long, thereby reducing efficiency or throughput.

It is also well-known that hydrocolloid gums such as gelatin, agars, carrageenans, gellan gum, pectins, alginates, etc., have an ability to bind high-moisture systems in a continuous gel matrix. Some of these gums, such as the alginates and low methoxyl pectins set into a gel upon exposure to specific chemicals, usually sources of calcium or similar bivalent ions. Others such as the gelatins, carrageenans, gellan gum and high methoxyl pectins set into a gel upon cooling following solubilization. Batch molding techniques using such hydrocolloid gums have been developed to form confectionery items. One example is the starch molding process in which impressions are made in a bed of compacted starch powder and then filled with a liquid containing solubilized thermal-setting gums, followed by cooling to set the gel. However, this method requires very expensive starch handling and fluid dispensing equipment and is not economical to use to form the small diameter gelled aqueous products with which we are concerned primarily here.

Until now there has been no way to form substantially continuously and economically small, gelled products with a high-moisture content, especially such products incorporating gums that gel upon cooling.

SUMMARY OF THE INVENTION

Accordingly, it is an object of the present invention to provide a process for producing high-moisture gelled extrudate forms of limited diameter substantially continuously and economically.

Another object of the invention is to provide a process for producing such gelled extrudate pieces which form upon cooling.

A further object of the invention is to provide a process of this type which can produce gelled extrudate forms which are heat stable.

Another object of the invention is to provide such a process which can produce high-moisture content, flavor sensitive simulated fruit pieces.

An additional object is to provide apparatus for carrying out the above process.

Other objects will in part be obvious and will in part appear hereinafter.

The invention accordingly comprises the several steps and the relation of one or more such steps with respect to each of the others, and the apparatus embodying the features of construction, combination of elements and arrangement of part which are adapted to affect such steps, all is exemplified in the following detailed description, and the scope of the invention will be indicated in the claims.

Our process provides continuous "ropes" or "worms" of gelled, water-based formulas suitable for cutting into regular segments to form individual product pieces. The ropes may have a moisture content from 30% to as high as 98%. If below that range, the rope becomes difficult to pump; if above, there is poor thermal exchange and the holding time becomes excessively long. Such ropes may also contain a variety of water-soluble or non water-soluble active ingredients. The process may be applied to a wide variety of formed products including simulated vegetable and fruit pieces, and various flavored or non-flavored gelled water systems, including artificial baits, and gelatin ropes and pieces such as are used in oriental desserts and beverages, i.e., mitsumame gels. Preferably, the gel(s) should be present in an amount between 0.5 and 5.0 weight percent of the product. If less, the resultant product has poor shape retention; if more, the gel may not get into solution.

The various formed gelled products may subsequently be reduced in moisture through drying to produce shelf-stable food products such as dried fruit and vegetable pieces that are characterized by high shape retention and high natural flavor retention.

The process for producing the gelled aqueous products includes the following steps:

At least one thermal-gelling gum is dispersed in an aqueous base below the solubilization temperature of the gum and is mixed under the correct pH and temperature conditions for the particular gum(s). The thermal-gelling gums may include any gum that forms a gel upon cooling below its gellation temperature including, but not limited to, carrageenans, high-methoxyl pectins, egars, gellan gums and gelatins. In some cases, it may be desirable to include auxiliary gums such as xanthan gum, locust bean gum or the like in order to modify the texture of the product or to improve the extrudability of the product.

Next, the mixture is heated uniformly to a temperature above the solubilization temperature of the gum(s) and, in the case of a food product, usually to a temperature suitable for pasteurization.

Then, the mixture is cooled uniformly to a temperature just above (i.e., about 5° F.) the gellation temperature which is the temperature at which the liquid system incorporating the gum(s) begins to crystallize and change to a solid state. This temperature is influenced considerably by the composition of the liquid formulation and the choice of gum(s).

Finally, the cooled mixture is pumped through a manifold feeding one or more confining conduits such as long tubes, each of which is open at the discharge end and controlled by a valve at the manifold end, the tubes being surrounded by a cooling medium. The mix is preferably pumped into the tubes sequentially, allowing for a static residence time in each tube determined by the rate of gellation of the chosen thermal-gelling gum(s). The manifold and tubes may be made of any strong, rigid food-compatible material.

Thus, in accordance with our process, the gelled aqueous product is molded while gelling to the shape of the tube, the change from a liquid state to a solid state taking place during the residence time in the tube. Each solid product is subsequently pushed out of the tube by the next filling of the tube. Thus, the product emerging from each tube is a rope of gelled aqueous product whose diameter corresponds to the inside diameter (ID) of the tube. Preferably that diameter is in the range of 0.25 to 1.0 inch. If the diameter is any less, the process may not be economical due to the relatively small volume of product per tube, if more, the residence time required for uniform cross-sectional gelation of the product may be too long. Each length of the tube is selected to provide the correct residence time in the tube. Tube lengths of from ten to twenty feet have been used to successfully form gelled aqueous products according to our method.

Any number or tubes may be used in our process allowing for fast and economical scaling of the process. Instead of having one valve control the filling of each tube, several tubes may be filled simultaneously through one valve to further increase the throughput. For optimum control of the process, the timing of the valves may be adjusted by a programmable controller which can be programmed to adjust the tube filling sequence so that there is a controlled rate of emergence of gelled material from each tube and such that the product is continuously emerging from at least one of the tubes at any given time. Of course, if desired, the controller may be programmed to produce products semi-continuously or in batches if that is desired for a particular application.

Preferably, the discharge ends of the tubes are lined up so that the tube extrudates may be cut by a single cutter to form individual rope segments or pieces which may be incorporated into other products or processed further.

BRIEF DESCRIPTION OF THE DRAWING

For a fuller understanding of the nature and objects of the invention, reference should be had to the following detailed description taken in connection with the accompanying drawing which illustrates an extrusion system used to make small diameter ropes of gelled aqueous product according to our invention.

DESCRIPTION OF THE PREFERRED EMBODIMENT

Our process may be used to produce substantially continuously a water-based gelled product having a high-moisture content and good shape retention and with a diameter generally less than 1.0 inch and preferably less than 0.5 inch. One preferred product is a fruit puree-based food with a high-level of sugar solids which, when subsequently dried, is stable at room temperature. The process for producing such a product is described in the Example 1 below.

EXAMPLE 1

The following formulation was used to produce shelf-stable wild blueberry pieces:

| Ingredients | Product Formula (wt. %) | Source |
|---|---|---|
| Pureed wild blueberries | 60.00% | Grade A, Jasper Wyman & Son |
| Crystalline fructose | 38.75% | Krystar 300 A. E. Staley |
| Sodium citrate | 0.40% | USP Granular, ADM |
| Gellan gum | 0.35% | Kelcogel F, Kelco Div. Merck |
| Citric acid | 0.40% | USP granular, ADM |
| Calcium lactate pentahydrate | 0.10% | A. Schlesinger |
| TOTAL | 100.00% | |

Wild blueberries were pureed at a temperature of about 30° F. using a disintegrator (Corenco). The puree was placed in a steam-jacketed kettle equipped with a high-shear homomixer (Greerco). The gellan gum and sodium citrate were dry blended with the fructose and added into the vortex produced by the homomixer set on downflow mode. After all the powder was added, the mixer was changed to upflow mode and allowed to shear at a maximum rate for five minutes to ensure full dispersion of the ingredients. The sodium citrate served as a buffer to control the pH to a level above 4.0, which is suitable for the proper solubilization of gellan gum and to ensure that the gellan gum does not begin the gelation phase prematurely.

The blueberry mixture was then heated to 190° F. at which point the citric acid and calcium lactate were added and thoroughly mixed in. This resulted in a pH decrease from 4.2 to 3.6 and the product was held at 190° F for two minutes (pasteurization time for a pH of 3.6). The citric acid was used to bring the pH back to about 3.5, the normal pH level of fruit products. The more acid pH is also desired to properly activate the gellan gum and also serves to release calcium ions in the system. The calcium lactate serves as a source of calcium to insure adequate calcium for proper gellan gum gellation and, especially, to promote the secondary chemical gellation characteristic of gellan gum which makes the gel heat-irreversible.

The pasteurized product was then cooled in the kettle with constant stirring until a temperature of 140° F. was reached, i.e., about 5° F. above the 135° F. gellation temperature of the gel. At that point, the temperature was held within 2° F. of the hold temperature of 140° F. by injecting steam into the jacket of the kettle.

Next, referring to the drawing figure, the liquid product was then pumped from the kettle 10 by a positive displacement pump (Waukesha) equipped with a speed controller set at 19.75 Hertz to a manifold 14 having eight outlets each equipped with a solenoid-operated valve 16, each valve leading to a long tube 18 open at its discharge end. In the illustrated system, there are eight tubes 18 connected in parallel to the pump, each having an ID of about 0.44 inch and a length of about 12 feet. The manifold 14 and tubes 18 are of a strong rigid material such as stainless steel or polytetrafluoroethylene (Teflon).

The tubes 18 all extend along most of their lengths through a cooling manifold 20 containing a cooling medium. The illustrated manifold 20 contained water maintained at a temperature of about 40° and circulated through the manifold at a rate of about four gallons per minute.

As shown in the drawing figure, the discharge ends of tubes 18 are aligned horizontally and a rotary cutter 22 is located just beyond those ends so as to be in position to cut the ropes emerging from all of the tubes 18.

The valves 16 controlling the inlets to the tubes 18 are controlled by a controller 24 such that each tube 18 is filled in sequence for about 12.5 seconds followed by a static residence time of product in each tube for about 87 seconds. As each tube is filled, the statically formed gel in that tube is ejected as a continuous rope which is then cut by cutter 22 which may cut at a speed of 1000 cuts per minute to yield small cylindrical product pieces which are about 0.44 inch in diameter and approximately 0.5 inch long.

Preferably, the extrusion system includes a recirculation loop 26 extending from manifold 14 back to kettle 10 so that any excess liquid in manifold 14 during each cycle may be returned to kettle 10. A valve 28 in the recirculation loop 26 is opened and closed by controller 24 to control the product recirculation.

Preferably, also, during the filling of each tube 18, a plug P consisting of about one foot of gelled product from the previous filling is left in each tube to serve as an exit plug for that tube. That plug is pushed out first during the next refilling of that tube.

The cylindrical pieces emerging from the tubes 18 had a superior natural wild blueberry flavor and a pleasing texture. They also held their shape quite well. Since the formulation incorporated gellan gum, the fruit pieces were thermally stable so that they could be baked at a high temperature in excess of 300° F. without melting.

Some cylindrical pieces were loaded onto the trays of a dehydrator (Excalibur) and dried at a temperature of 135° F. for eight hours. After drying, the pieces had a water activity ($A_w$) of 0.45 and were suitable for use in baked goods or in a room-temperature shelf-stable package. The gel pieces after drying were similarly resistant to heat.

EXAMPLE 2

The following formulation for a gelled bait worm was prepared:

| Ingredients | Product formula (wt. %) | Source |
| --- | --- | --- |
| Water | 95.50% | Tap |
| Potassium chloride | 2.00% | USP |
| Kappa carrageenan | 1.50% | BenGel 2000, Shemberg USA |
| Locust bean gum | 1.00% | Ticolloid, TIC |
| TOTAL | 100.00% | |

The potassium chloride was mixed into the water first in order to help dispersal of the carrageenan gum. The carrageenan and locust bean gum were sprinkled into the water vortex formed by a lab homomixer (Arde Barinco) operated on a down-flow mode and thoroughly dispersed using high-shear up-flow for about 5 minutes.

The water dispersion was then heated with constant mixing to a temperature of 190° F. followed by even cooling with constant stirring to a temperature of 130° F., at which point the product was held at that temperature for pumping into the tubes 18 as in Example 1. In this case, the resulting cylindrical ropes were cut into three inch lengths suitable for use as bait. The rope was very flexible and tough.

If desired, such a rope can be flavored by incorporating artificial or natural fish flavors or oils into the mix just before the cooling step and the resultant product can be toughened further by controlled drying.

It should be mentioned also that, unlike the gellan-base product, the carrageenan-based formulation is thermally reversible so that the gel can be melted by the addition of heat and re-gelled. This allows for the efficient use of waste product, trimmings, etc.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention described herein.

What is claimed is:

1. A method of making a gelled aqueous formed product comprising the steps of mixing together at least one thermal-gelling gum and an aqueous product base at a temperature below the solubilization temperature of the gum to disperse the at least one gum in the base;

heating the mixture to a temperature above the solubilization temperature of the gum;

cooling the mixture to a temperature just above the gelation temperature of the mixture;

pumping the mixture through at least one confining conduit maintained at a temperature below the gelation temperature of the mixture, and controlling the pumping so that the mixture has a static residence time in said at least one conduit sufficient to produce substantially uniform cross-sectional gelation of the mixture within said at least one conduit to produce said gelled aqueous formed product and pumping said gelled product from said at least one conduit.

2. The method defined in claim 1 wherein the mixture is pumped through a plurality of conduits connected in parallel, and the pumping is controlled so that the mixture is pumped into the conduits sequentially so that formed product emerges substantially continuously from the conduits collectively.

3. The method defined in claim 1 and including the additional step of cutting the formed product pumped from each conduit into substantially equal lengths.

4. The method defined in claim 1 wherein the at least one gum is selected from the group consisting of carrageenans, high-methoxyl pectins, agars, gelan gums and gelatins.

5. The method defined in claim 1 wherein the pumping is controlled so as to leave a plug of formed product from a previous filling in an exit end segment of each conduit.

6. A method of making long ropes of a gelled water-based formed product on a substantially continuous basis comprising the steps of mixing together a thermal-gelling gum and an aqueous product base to form a mixture;

filling said mixture under pressure into a plurality of confining conduits maintained at a temperature below the gelation temperature of the mixture, and controlling the filling of the conduits sequentially to provide a selected static residence time of the mixture in the conduits to cause gelation of said mixture to form said gelled formed product and sequentially pushing said gelled formed product out of the conduits after said time so that gelled formed product emerges substantially continuously from the conduits collectively.

7. The method defined in claim 6 wherein the filling is controlled so as to leave a plug of formed product from a previous filling in an exit end segment of each conduit.

8. A method of making a gelled aqueous formed product comprising the steps of mixing together at least one thermal-gelling gum and an aqueous product base to form a mixture;

heating the mixture to a temperature above the solubilization temperature of the gum to form an ungelled mixture;

pumping a selected volume of said ungelled mixture into one end of a conduit having two ends and maintained under a controlled temperature so that the ungelled mixture has a static residence time in the conduit sufficient to thermally set the ungelled mixture throughout its cross-sectional area thereby forming a gelled product within the conduit;

pumping a succeeding selected volume of the ungelled mixture into the conduit one end to forcibly eject the gelled product from the conduit other end.

9. The method defined in claim 8 and including the additional step of cutting the gelled product pumped from the conduit into substantially equal lengths.

10. The method defined in claim 8 wherein the at least one gum is selected from the group consisting of carrageenans, high-methoxyl pectins, agars, gelan gums and gelatins.

* * * * *